United States Patent [19]
Schulz et al.

[11] Patent Number: 6,036,813
[45] Date of Patent: Mar. 14, 2000

[54] METHOD OF MAKING ANISOTROPIC CONDUCTIVE ADHESIVE INTERCONNECTS FOR HEAD ATTACHMENT IN RIGID DISC DRIVE DEVICE FOR MANUFACTURING A GROOVE BEARING

[75] Inventors: Kevin Jon Schulz, Apple Valley; Cal Edward Hardie, Edina; David Alan Zoz, Rochester, all of Minn.

[73] Assignee: Seagate Technology, Inc., Scotts Valley, Calif.

[21] Appl. No.: 08/888,148

[22] Filed: Jul. 3, 1997

Related U.S. Application Data

[62] Division of application No. 08/700,284, Aug. 20, 1996.

[51] Int. Cl.[7] ............................ B29C 65/50; G11B 07/22; G11B 05/105
[52] U.S. Cl. .................................. 156/307.7; 156/308.2; 438/119
[58] Field of Search ............................ 156/308.6, 308.2, 156/307.7; 438/119

[56] References Cited

U.S. PATENT DOCUMENTS

| | | | |
|---|---|---|---|
| 3,912,852 | 10/1975 | Simon | 174/68.5 |
| 4,701,659 | 10/1987 | Fujii et al. | 310/334 |
| 4,740,657 | 4/1988 | Tsukagoshi et al. | 174/88 R |
| 5,215,608 | 6/1993 | Stroud et al. | 156/64 |
| 5,223,997 | 6/1993 | Uemura et al. | 360/103 |
| 5,304,460 | 4/1994 | Fulton et al. | 430/311 |

*Primary Examiner*—Francis J. Lorin
*Attorney, Agent, or Firm*—Flehr Hohbach Test Albritton & Herbert, LLP

[57] ABSTRACT

A method of assembling an actuator arm for use in a disc drive is disclosed. The actuator arm includes a head gimbal assembly which supports a slider and magnetic head, and a slider supported from the gimbal. The actuator arm also includes a layer of Z-axis conductive adhesive film between the gimbal and the top surface of the slider for bonding the gimbal to the slider, and providing both mechanical support and electrical grounding for the slider.

3 Claims, 5 Drawing Sheets

METHOD OF MAKING ANISOTROPIC CONDUCTIVE ADHESIVE INTERCONNECTS FOR HEAD ATTACHMENT IN RIGID DISC DRIVE DEVICE FOR MANUFACTURING A GROOVE BEARING

This is a divisional of application Ser. No. 08/700,284 filed Aug. 20, 1996.

FIELD OF THE INVENTION

This invention relates generally to the field of disc drives, and more particularly to techniques for making electrical connections in small disc drives.

BACKGROUND OF THE INVENTION

Magnetic read/write heads require an electrical path between the read/write transducer and the read/write circuitry and amplifier components which are typically located at a distance from the heads or transducers. The miniaturization of disc drives in a particular head assemblies has made this task increasingly difficult. Because the signal strength is relatively low, it is important for one component to be attached to another or to the read/write circuitry with a minimum of electrical resistance between the components.

Conventionally, discrete wire assemblies have been used to make the interconnections. Manufacturing processes use manual assembly operations for ultrasonic bonding of the wires to the heads, routing, crimping, and tacking the wire assemblies down to the suspension and actuator arms, and soldering the wires to a flexible printed circuit. These manual operations are increasingly costly because of the high labor costs and also because of the difficulty in maintaining high quality. Attempts to automate ultrasonic bonding and solder termination processes have proven costly and have had only limited success. This is because the heads and wire assemblies are mounted on actuator arms which are computer controlled to rapidly move the head from position to position to read and write information on an associated computer disc. The heads must be moved as rapidly as possible over the magnetic recording medium. This rapid movement produces acceleration and deceleration forces on the heads which are very high. Moreover, the movements are repeated at a rapid rate and occur frequently over the long life of the disc. The disc drive, being frequently mounted in a portable computer, may also be subjected to other sharp shocks. Any of these shocks could break down the mechanical bond between the wires and the transducer or amplifier, breaking the connection or increasing its resistance.

Attempts to automate ultrasonic bonding and solder termination processes have been costly, and have only limited success.

SUMMARY OF THE INVENTION

It is an object of the present invention to overcome the above difficulties with prior art approaches to attaching the wire bundle running from the slider to the external electrical connectors in a disc drive.

A related object of the present invention is to provide a simplified, reliable process for assembly of the actuator arm and slider in a disc drive.

A further related objective of the invention is to provide a reliable interconnect between slider and actuator which can withstand the many rapid movements of the slider over its associated magnetic medium during the usage of the disc drive.

These and other objectives of the present invention are achieved by using a z-axis conductive adhesive such as an anisotropic conductive adhesive (ACA) for making interconnections between slider supporting the read/write heads, and the gimbal which supports the heads from the actuator arm, as well as connecting the flexible circuit which provides the electrical connections to the slider and at the opposite end of the flexible circuit and associated wire bundle, connecting the wire bundle to the actuator board bonding pads. The slider includes bonding pads on either the top or front surface of the slider. The flexible circuit is bonded by the ACA material to the bonding pad of the slider. The suspension flexible circuit, which includes the necessary connecting wires for conducting the signals from the head, is routed down the suspension and actuator arm and is bonded to the flexible circuit supported at the opposite end of the actuator arm with the ACA material. In a related approach, the necessary grounding path between the slider body and the stainless steel suspension at gimbal end of the actuator arm is achieved by providing a connection between the stainless steel gimbal and the slider, utilizing the ACA adhesive material.

Alternatively, a bump interconnect technology (BIT) may be used to form the mechanical/electrical connections. Such bump interconnects makes use of a bumped interconnect pad to establish contact; the adhesive does not include conductive material or filler.

Other features and advantages of the present invention will become apparent from the study of the following description given in connection with the following drawings.

DETAILED DESCRIPTION OF A PREFERRED EMBODIMENT

Figure 1:
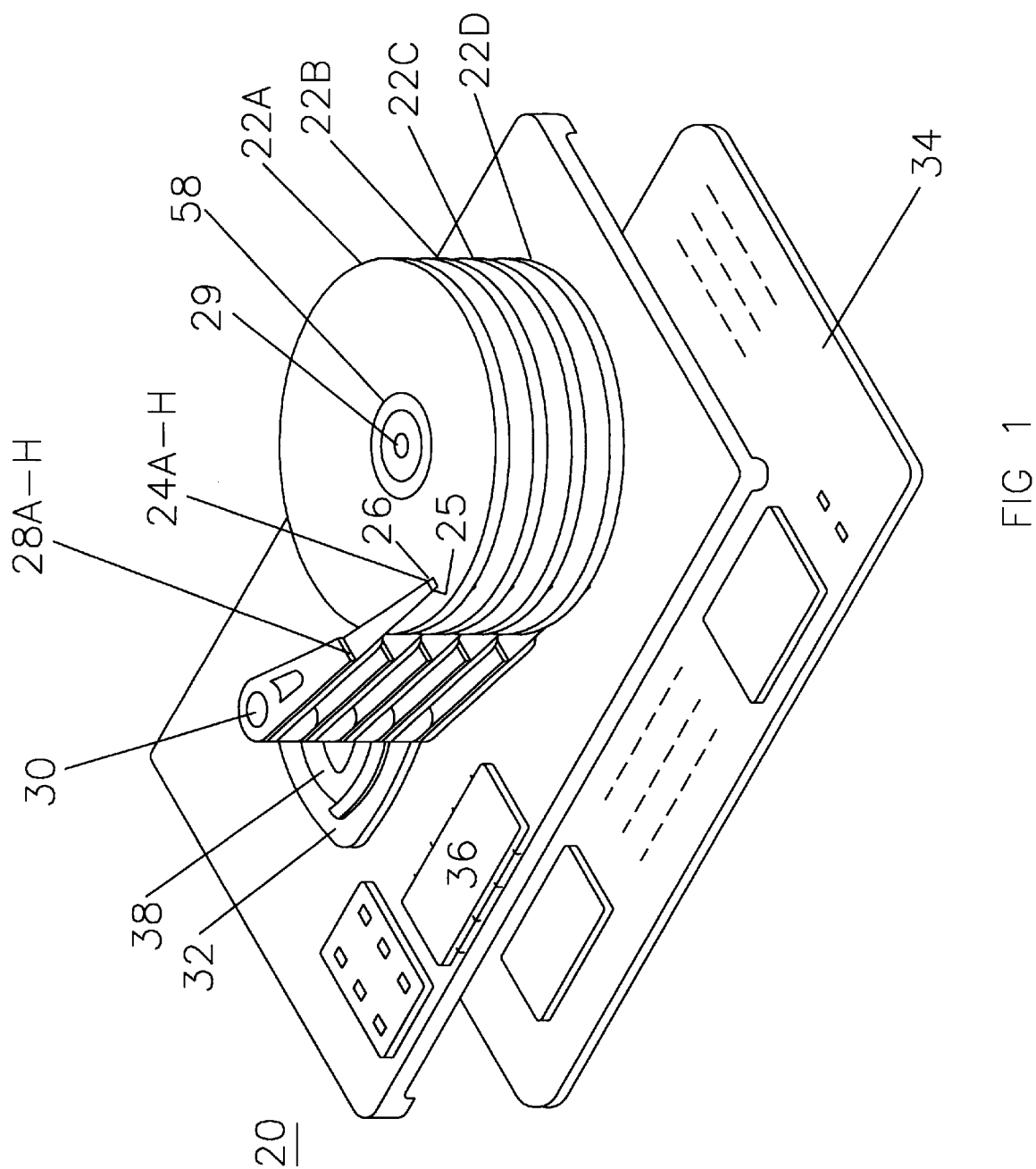
FIG. 1 is a perspective of a disc drive in which the present invention is useful.

Referring now to the drawings, and initially to FIG. 1, this figure illustrates an example of a disc drive of a type in which the present invention is especially useful, designated generally by the reference numeral 20. Disc drive 20 includes a plurality of storage discs 22a–d and a plurality of associated read heads 24a–h. Each of the storage discs 22a–d is provided with a plurality of data tracks to store user data. As illustrated in FIG. 1, one head or transducer is provided for each surface of each of the discs 22a–d such that data can be read from or written to the data tracks of all the storage discs. It should be understood that the disc drive 20 is merely representative of a disc drive system utilized in the present invention, and that the present invention could be implemented for use in connection with a disc drive system including more or less storage discs.

The storage discs 22a–d are mounted for rotation by a spindle motor arrangement 29 as is known in the art. Moreover, the read/write heads 24a–h are supported by respective actuator arms 28a–h for controlled positioning over preselected radii of the storage discs 22a–d to enable the reading and writing of data to and from the data tracks. To that end, the actuator arms 28a–h are rotatably mounted on a pin 30 which also supports at least one element of a voice call motor 32 which is operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown) all in a known manner. As typically utilized in disc drive systems, the sliders 26 cause the magnetic transducers 25 of the read/write heads 24a–h to "fly" above the surfaces of the respective storage disc 22a–d for noncontact operation of the disc drive system as discussed above. When not in use, the voice coil motor 32 rotates the actuator arms 28a–h during a contact stop operation to position the read/write heads 24a–h over a respective landing zone 58, where the read/write heads 24a–h come to rest on the storage disc surfaces. As should be understood, each of the read/write heads 24a–h is at rest on a respective landing zone 58 on a disc at the commencement of a contact start operation.

A printed circuit board (PCB) 34 is provided to mount control electronics for controlled operation of the spindle motor 29 and the voice call motor 32. The PCB 34 also includes read/write channel circuitry coupled to the read/write heads 24a–h, to control the transfer of data to and from the data tracks of the storage discs 22a–d. Thus, control wires must run from the PCB 34 through an interface 36 to a region adjacent the pivot 30 and then out from the pivot region to the coil 38 of the voice call motor which is supported on one side of the pivot 30; a separate set of wires run to read/write heads 24a–h supported on the actuator arms 28a–h on the opposite side of the pivot 30. It is immediately apparent that these wire connections to the read/write heads are subject to considerable stress as the actuator arm moves rapidly, radially across the surface of the discs. It is also apparent that these connection both where connector wires are supported adjacent pin 30 at one end of the actuator arm and where the lead wire or flexible circuits are connected to the transducers 24a–h at the distal end of the actuator are subject to the stress both of the rapid movements and of the shocks which may be imposed on the disc drive and its actuator arms.

FIG. 2A and 2B show a first example of the use of ACA material to assemble and bond the transducer wiring to the actuator board pads.

Referring to FIG. 2A, the figure shows in greater detail the actuator arm 28 which appears in FIG. 1 supporting the head gimbal assembly 40 which includes, at its distal end from the rotating support 30 for the actuator arm 28, the support gimbal 50 for the transducer 24. A bundle of wires 52 is provided running from the transducer 24 to an actuator board 56. The board 56 supports a number of bond pads. 58 (as shown more clearly in the detailed view of FIG. 2B), with each set of bond pads being associated with the twisted wire assembly 52 running from the transducer 24 on one of the actuator arms 28.

In this particular embodiment of FIGS. 2A and 2B, a flexible circuit terminator tab 60 is bonded to the end of each wire bundle which runs to the transducer 24 on the associated actuator arm. This step of soldering or ultrasonic bonding between the terminator tab 60 and the twisted wire assembly can be done as a prefabrication step. These terminator tabs 60 are then bonded to each set of actuator board pads 58 using an intervening layer of conductive ACA which conducts only in the z-axis direction between each of the terminator tabs and the bond pads. The special virtue of ACA is that there is no conductivity in the X or Y direction, thus there is no promotion or creation of signals between adjacent wires or signal outputs. The preferred ACA material is a thermoplastic or thermoset dry film, which can be applied across all the interconnect board bond pads 58.

According to a preferred assembly method, individual tab terminator 60 running from each transducer 24 are aligned and held across the interconnect pads with adhesive tape. A hot bar tool can then be applied to the back of the terminator tab to provide the necessary heat and pressure to bond the ACA materials 62 to the terminator tabs 60. The twisted wire assembly can be fastened to the actuator arm 28 and head gimbal assembly 40 using known techniques either before or after this bonding step.

Figure 2:
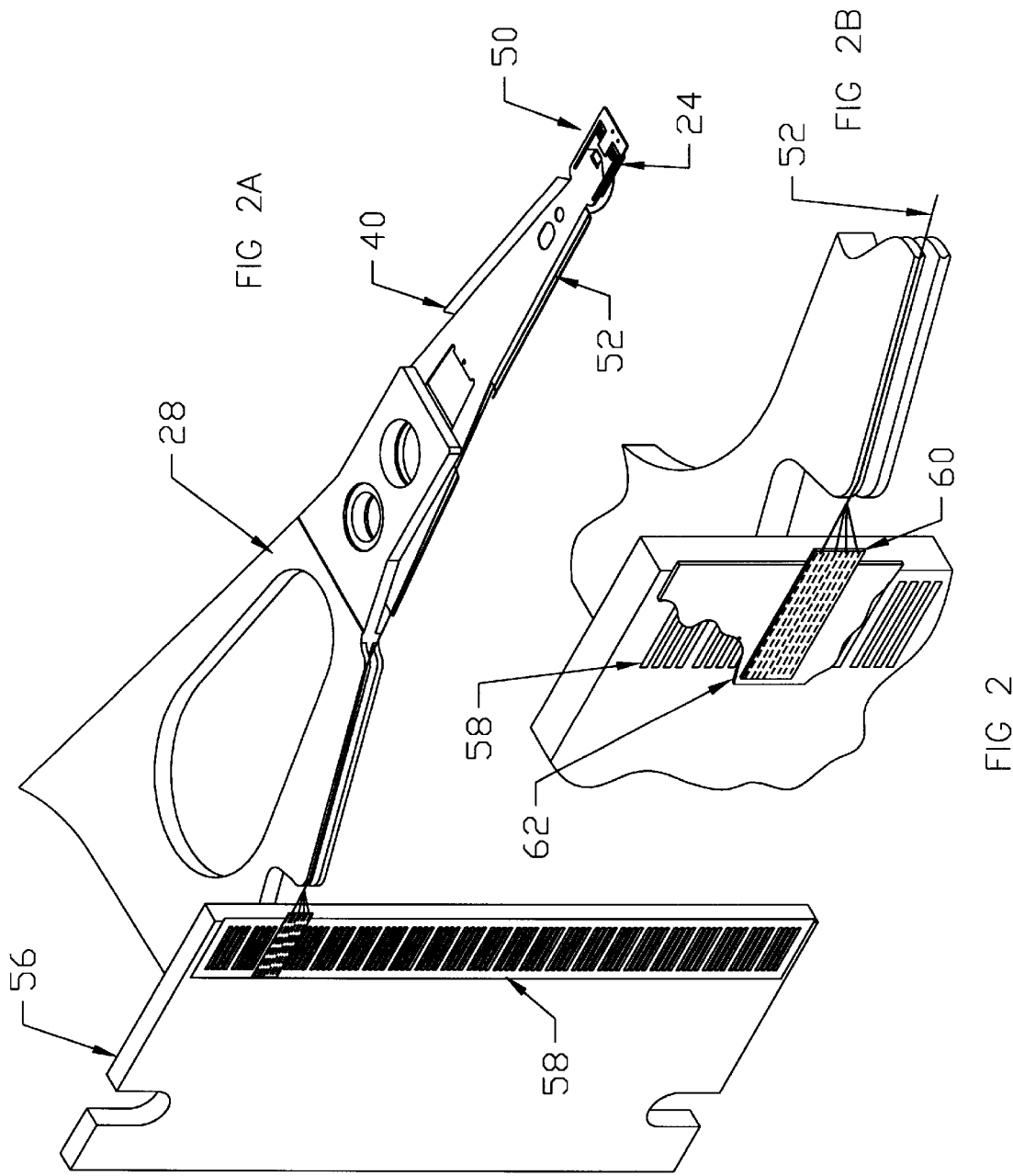
FIGS. 2A and 2B illustrate the manner in which a wire bundle may be connected to the slider and associated magnetic head and to the actuator board bonding pads using ACA material in accordance with the present invention.
Figure 3:
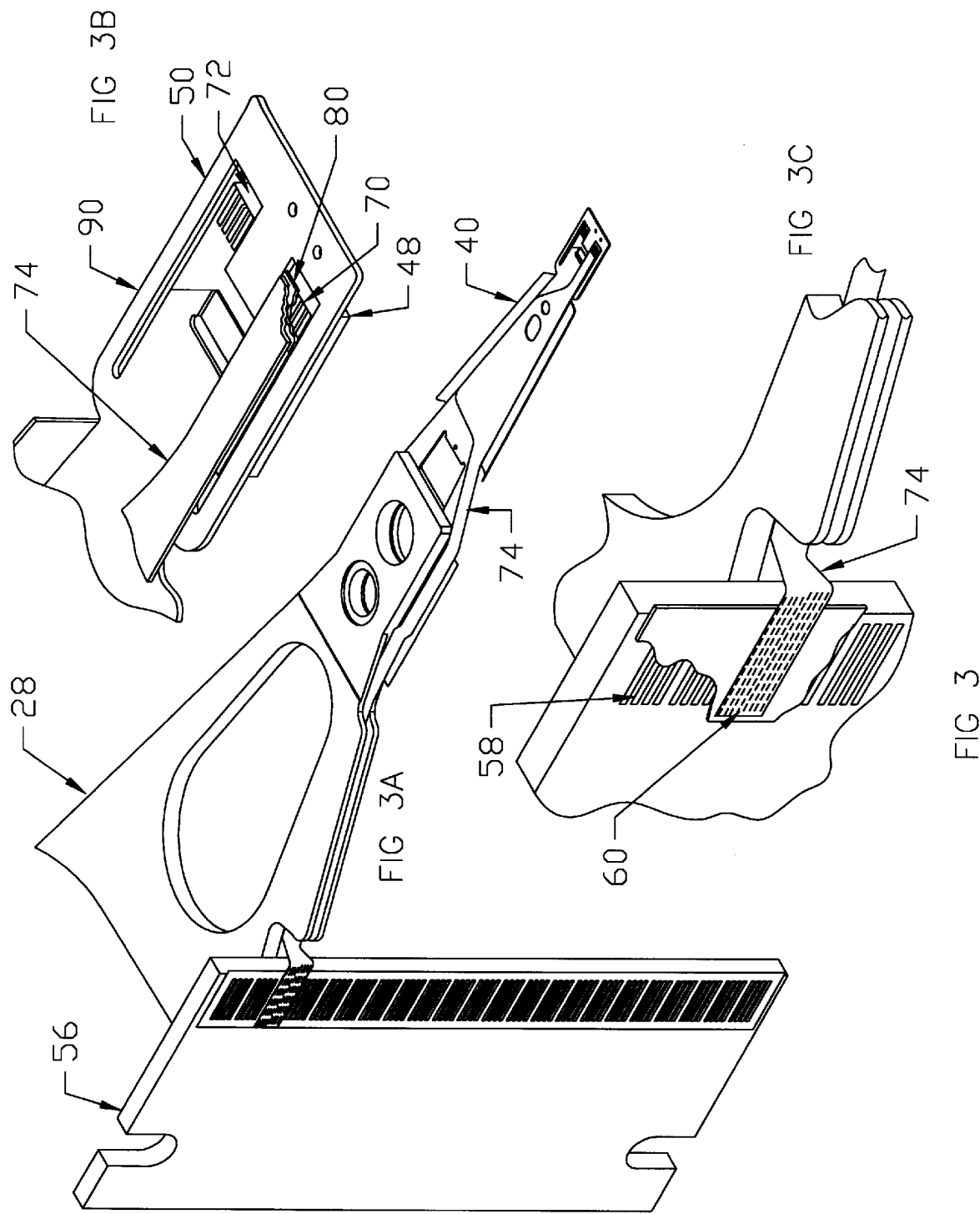
FIGS. 3A, 3B and 3C illustrate the manner in which a flexible circuit may be connected to a slider and at its opposite end to the actuator board bonding pads using ACA material in accordance with the present invention.

A second example is shown in FIG. 3. This is an alternative approach, using a flexible circuit interconnect rather than a twisted wire bundle running from the transducer to the actuator board as shown in FIGS. 3A, 3B and 3C. The physical details of the actuator arm gimbal, and actuator board are not themselves novel, and will not be described in great detail. It is the manner in which the connections are made at either end of the flexible circuit both structurally and in terms of the method utilized that forms the novelty of the present invention. Therefore, referring to FIG. 3A, this figure shows an actuator arm 28 and head gimbal assembly 40 which is of the same general type as described above and is already well known in this field. The suspension gimbal 50 is shown in greater detail in FIG. 3B in an enlarged form attached to the read/write head 28 which in this example, has top bonding pads 70. The bonding pads may also be fabricated on the front region 72 of the slider. The flexible circuit 74 which appears in all of FIGS. 3A, 3B and 3C extends along the side of the actuator arm 28 and ends in a flexible circuit terminator tab 60 as previously described with respect to FIG. 2. Thus, the bonding of the tab 60 to a set of actuator board bonding pads 58 may be carried out according to the same process and achieving the same structure as shown in FIG. 2B. As to fastening the flexible circuit to the head top bonding pads 70, a layer of ACA, preferably a liquid dispensed ACA 80, is provided over the top of the head top bonding pads 70; the flexible circuit 74 is then placed over these bonding pads and UV bonded to the top bonding pads 70.

Figure 4:
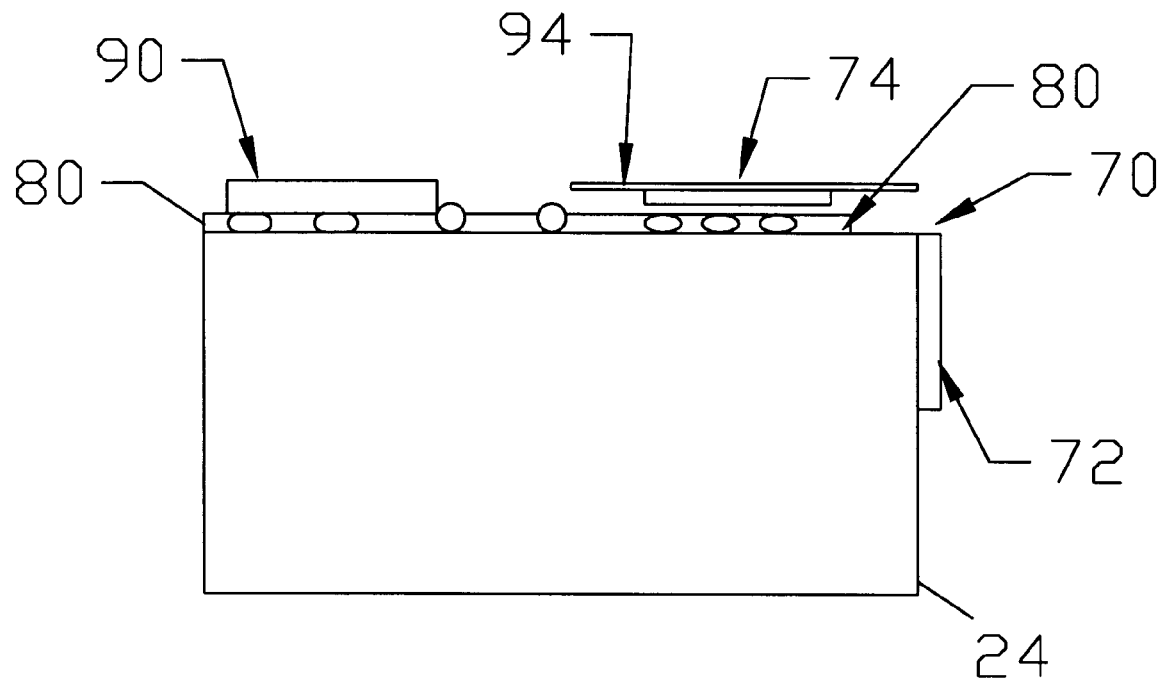
FIG. 4 illustrates further details of the ACA connection between the slider top bonding pads and the flexible circuit in between the stainless steel gimbal and slider body.

This assembly also appears more clearly in the vertical section of FIG. 4, which shows the flexible circuit 74, the top bond pads 70, and the ACA adhesive 80, which is conductive only in the Z axis direction to reliably establish the electrical connection.

As an alternative, as previously described, the bonding pads 72 may be provided on the front of the slider, in which case the flexible circuit will be extended forward and bent down over the bond pads to be fastened by the conductive adhesive 80.

A further advantage of approach illustrated in FIGS. 3A–3C is that the suspension gimbal 90 which appears in both FIG. 3B and in FIG. 4 may be also bonded to the top of the slider using a separate or the same layer of conductive ACA material 80. In addition to helping to support the slider from the gimbal, the use of an ACA bonding material 80 provides a grounding path between the slider body and the stainless steel suspension gimbal 90.

Other alternative approaches to the present invention may also be utilized. For example, in addition to suspending the slider and adhesively attaching it to the suspension and actuator arm using the flexible circuit approach, a laminated integrated circuit processed with the suspension, or an integrated suspension circuit additively applied to the suspension using coating, plating and thin film techniques in the region generally indicated at 94 in FIG. 4 can also be provided.

In a further alternative, the preamplifier circuit shown in FIG. 1 can be incorporated into the flexible circuit, printed circuit or ceramic circuit region of the actuator board.

As already noted, the ACA is used at locations 80, 90, between the slider body and the stainless steel gimbal spring to provide a grounding path for static charge which accumulates on the slider. Further, the ACA may serve as the primary mechanical bond between the slider and the suspension, or as a secondary conductive bond to other conductive arrangement.

In forming the bonds, the ACA material may be applied as a liquid, paste, or dry film, or a thermoplastic polymer, thermosetting polymer, or a UV-curable polymer, depending on the method to be utilized in forming the assembly.

Among the many advantages of the approach, is that a method is hereby provided which is easy to automate, providing a short bonding cycle and rapid throughput as well as being easy to rework.

The method and apparatus are applicable for fine pitch and small pad sizes, and enable easy attachment of flexible circuit and integrated suspension circuit head interconnects. No special environment or flux are needed.

Figure 5:
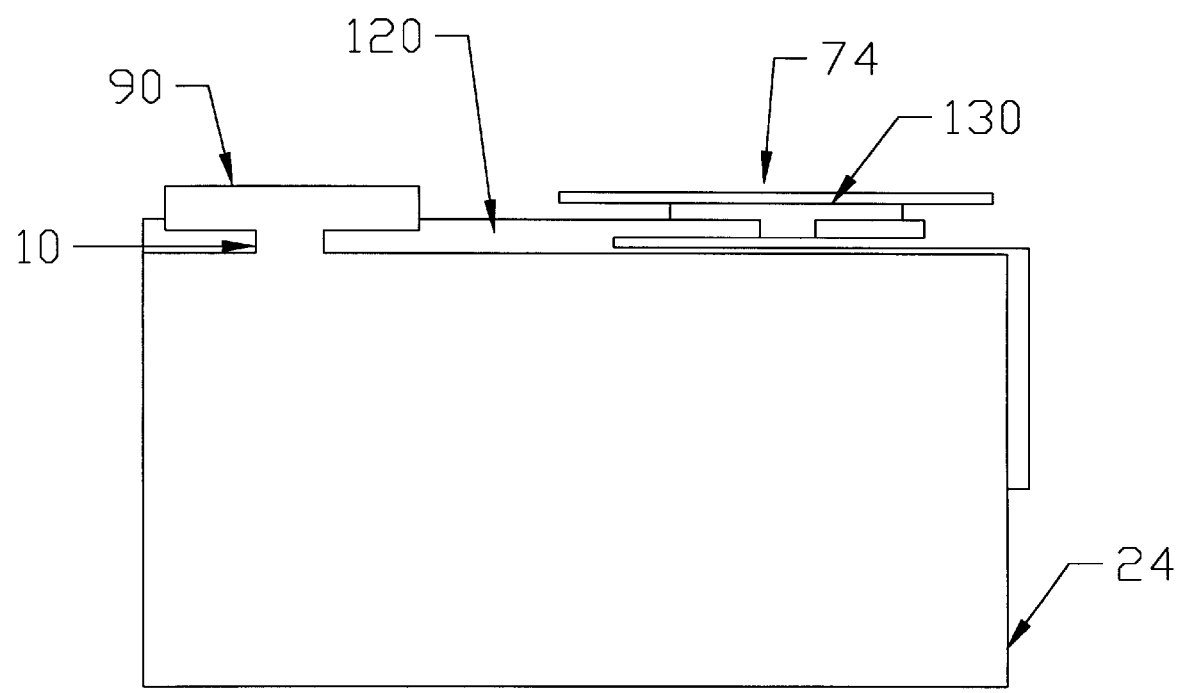
FIG. 5 illustrates an alternative approach to bonding a slider to a flexible circuit.

An alternative to the use of ACA materials is shown in FIG. 5, and relies on the use of bump interconnect technology (BIT), which utilizes bumps formed on one of the interfacing surfaces to form the electrical connections. Thus the gimbal 90 now has one or more bumps 110 on the surface facing slider 24. The bump or bumps 110 provide the electrical connection between gimbal and slider; the mechanical adhesion is established by a standard unfilled conductive adhesive 120. Similarly, contact bumps 130 can be provided on the surface of a flexible circuit 74 facing the slider 24. The remaining interface area is substantially filled with a standard non-conductive adhesive, forming a tight bond.

Other features and advantages of the present invention may become apparent to a person of skill in the art who studies the present invention disclosures. Therefore, the scope of the present invention is to be limited only by the following claims.

We claim:

1. A method of assembling an actuator arm, actuator board pads, and electrical connectors running along said actuator arm from said actuator board pads to a slider supporting a magnetic head comprising the steps of:

(a) applying a thermoplastic or thermosetting dry film of anisotropic conductive adhesive (ACA) material to a set of actuator board bonding pads corresponding to said actuator arm;

(b) holding a flexible circuit terminator supporting conductors for signals from said magnetic heads over said selected bonding pads and said ACA material; and (c) applying a hot tool over said flexible circuit terminator and said ACA material to provide heat and pressure to cause the film to soften to a flowable state and then to bond the flexible circuit terminator and ACA material to said actuator board bonding pads to establish both a mechanical support and an electrical connection between said flex terminator circuit and said actuator board bonding pads.

2. A method as claimed in claim 1 wherein said flexible circuit terminator extends along said actuator arm and over a suspension gimbal at a distal end of said actuator arm to said magnetic head, said slider supporting bonding pads on a top or front surface of said slider, applying a layer of ACA over said bonding pads, and bonding said flexible circuit terminator to said bonding pads to establish both a mechanical support and an electrical connection between said flex terminator circuit and said magnetic head.

3. A method as claimed in claim 2 including the further step of applying a further layer of said ACA material to a top surface of said slider, and pressure bonding said suspension gimbal to said top surface of said slider to establish both a mechanical support and a electrical grounding between said gimbal and said slider.

* * * * *